United States Patent

Kajikawa

(10) Patent No.: US 10,184,517 B2
(45) Date of Patent: Jan. 22, 2019

(54) NEEDLE ROLLER BEARING WITH DOUBLE ROW OF RETAINERS

(71) Applicant: NTN CORPORATION, Osaka (JP)

(72) Inventor: Syuichi Kajikawa, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/034,620

(22) PCT Filed: Nov. 14, 2014

(86) PCT No.: PCT/JP2014/080161
§ 371 (c)(1),
(2) Date: May 5, 2016

(87) PCT Pub. No.: WO2015/076192
PCT Pub. Date: May 28, 2015

(65) Prior Publication Data
US 2016/0273580 A1     Sep. 22, 2016

(30) Foreign Application Priority Data
Nov. 21, 2013  (JP) .................................. 2013-240846

(51) Int. Cl.
*F16C 19/48*     (2006.01)
*F16C 19/52*     (2006.01)
(Continued)

(52) U.S. Cl.
CPC ............ *F16C 19/48* (2013.01); *F16C 19/527* (2013.01); *F16C 33/4605* (2013.01);
(Continued)

(58) Field of Classification Search
CPC .. F16C 19/48; F16C 33/4605; F16C 33/4629; F16C 33/48; F16C 33/54; F16C 33/545
See application file for complete search history.

(56) References Cited

U.S. PATENT DOCUMENTS 6,330,748 B1 * 12/2001 Muntnich .............. B21D 53/12
                                                   29/898.067
6,742,934 B2 *  6/2004 Matsuyama ........ F16C 33/3856
                                                   384/572

FOREIGN PATENT DOCUMENTS

CN    103277408    9/2013
CN    103322038    9/2013
(Continued)

OTHER PUBLICATIONS

Extended European Search Report dated Mar. 22, 2017 in corresponding European Application No. 14863944.6.
(Continued)

*Primary Examiner* — James Pilkington
(74) *Attorney, Agent, or Firm* — Wenderoth, Lind & Ponack, L.L.P.

(57) ABSTRACT

A retainer-equipped double-row needle-roller bearing includes a pair of annular end flange portions; a center annular center flange portion; and two rows of pillars connecting the portions to each other to provide pockets between mutually adjacent pairs of pillars in a circumferential direction for holding rollers in two rows. The center flange portion has an outer diameter ($\varphi D2$), and the end flange portions have an outer diameter ($\varphi D1$), in a relationship expressed as $\varphi D2<\varphi D1$. When the retainer moves radially by an amount of gap associated with the rollers, the retainer is guided on the outer diameter surfaces of the end flange portions at two ends of the retainer, by the inner diameter surface of a housing. This stabilizes behavior of the retainer during rotation, reducing premature wear and abnormal noise.

2 Claims, 4 Drawing Sheets

(51) Int. Cl.
  *F16C 33/46* (2006.01)
  *F16C 33/48* (2006.01)
  *F16C 33/54* (2006.01)
  *F16C 33/58* (2006.01)

(52) U.S. Cl.
  CPC ...... *F16C 33/4629* (2013.01); *F16C 33/4635* (2013.01); *F16C 33/48* (2013.01); *F16C 33/54* (2013.01); *F16C 33/545* (2013.01); *F16C 33/581* (2013.01); *F16C 2220/70* (2013.01); *F16C 2226/36* (2013.01); *F16C 2240/70* (2013.01)

(56) References Cited

FOREIGN PATENT DOCUMENTS

| DE | 16 34 218 | 2/1952 |
|---|---|---|
| JP | 54-82254 | 6/1979 |
| JP | 1-67330 | 4/1989 |
| JP | 2001-254743 | 9/2001 |
| JP | 2004-197878 | 7/2004 |
| JP | 2005-30468 | 2/2005 |
| JP | 2005-36836 | 2/2005 |
| JP | 2005-214390 | 8/2005 |
| JP | 2008-64151 | 3/2008 |

OTHER PUBLICATIONS

International Search Report dated Feb. 17, 2015 in corresponding International Application No. PCT/JP2014/080161.
International Preliminary Report on Patentability dated May 24, 2016 in corresponding International Application No. PCT/JP2014/080161.
Office Action dated May 19, 2017 in corresponding Chinese Application No. 201480063561.4 (with partial English translation).
European Patent Office Communication dated Dec. 8, 2017 in European Patent Application No. 14863944.6.

* cited by examiner

NEEDLE ROLLER BEARING WITH DOUBLE ROW OF RETAINERS

TECHNICAL FIELD

The present invention relates to a double-row needle-roller bearing with retainer for use in vehicle transmissions, industrial equipment and others.

BACKGROUND ART

Radial needle-roller bearings are utilized in vehicle transmissions and other equipment, but with increased output, longer life and higher speed of the vehicles in recent years, there is an increasing use of a double-row needle-roller bearing which has two rows of rollers disposed axially of a retainer (Patent Literature 1).

As shown in FIG. 4, a retainer-equipped double-row needle-roller bearing 11 includes two rows of rollers 12 held by a retainer 13. The retainer 13 has a pair of annular end flange portions 13a, 13a; a center annular center flange portion 13b; and two rows of pillars 13c, 13c connecting these portions to each other. Each pair of the pillars 13c which are mutually adjacent in a circumferential direction provide a pocket for holding one of the rollers 12.

CITATION LIST

Patent Literature

Patent Literature 1: JP-A 2005-36836 Gazette

SUMMARY OF INVENTION

Technical Problem

Bearings designed to be guided on their outer diameter can maintain stable rotation as the retainer's outer diameter surface is guided by an inner diameter surface of a housing when the retainer moves radially by an amount of gap associated with the rollers. In this arrangement, in a conventional double-row type retainer 13, the center flange portion 13b which has an outer diameter ($\varphi$D2) and the end flange portion 13a which has an outer diameter ($\varphi$D1) are controlled to be the same ($\varphi$D2=$\varphi$D1) as shown in FIG. 5.

In this arrangement, however, that the center flange portion 13b ($\varphi$D2) and the end flange portion 13a ($\varphi$D1) are controlled to have the same dimension, there are cases which can be caused by deformation during heat treatment for example: Namely, as shown in FIG. 6, in the retainer 13, the center flange portion 13b on the outer diameter surface has a greater diameter ($\varphi$D2) than a diameter ($\varphi$D1) of the end flange portion 13a, i.e., $\varphi$D2>$\varphi$D1. In other words, the retainer 13 becomes barrel shaped.

As shown in FIG. 6, once a retainer 13 becomes barrel-shaped, the retainer 13 is guided at a center of the center flange portion 13b, resulting in unstable behavior of the retainer 13, leading to abnormal noise. Also, contact mainly at the center of the center flange portion 13b increases contact pressure with a housing 14, leading to a problem of premature wear of the outer diameter surface of the retainer 13. FIG. 6 shows the retainer 13 which is moved radially in a direction indicated by an arrow.

It is therefore an object of the present invention to provide a double-row needle-roller bearing with retainer capable of preventing premature wear of the retainer or abnormal noise from the retainer.

Solution to Problem

In order to achieve the above described object, the present invention provides a double-row needle-roller bearing with a retainer comprising a pair of annular end flange portions; a center annular center flange portion; and two rows of pillars connecting said portions to each other to provide pockets between mutually adjacent pairs of pillars in a circumferential direction for holding rollers in two rows. In this arrangement, the center flange portion which has an outer diameter ($\varphi$D2) and the end flange portions which have an outer diameter ($\varphi$D1) are controlled to have a relationship expressed as $\varphi$D2<$\varphi$D1.

In order to achieve the relationship $\varphi$D2<$\varphi$D1, the center flange portion is made to have a smaller thickness T2 than a thickness T1 of the two end flange portions by appropriate means. In order to make the thickness smaller, coining may be performed to retainer material to reduce the thickness of the center flange portion, or material in the center flange portion may be partially removed mechanically by grinding or the like.

The relationship between the thickness T2 of the center flange portion and the thickness T1 of the end flange portions must be established as a value which will not reduce rigidity of the retainer even if the retainer is deformed. The value is T2≥0.8×T1, and more preferably, T2≥0.9×T1.

It should be noted here that as shown in FIG. 5, a bearing designed to be guided on their outer diameter maintains stable rotation as an outer diameter surface of the retainer 13 is guided by an inner diameter surface of a housing 14 when the retainer 13 moves radially by an amount of gap associated with the rollers 12. In conventional double-row type retainers 13, the center flange portion 13b which has an outer diameter ($\varphi$D2) and the end flange portion 13a which has an outer diameter ($\varphi$D1) are controlled to be the same ($\varphi$D2=$\varphi$D1).

The retainer may be heat treated and then be utilized after the heat treatment without performing grinding on its outer diameter.

The retainer may be formed by grinding or pressing.

Also, the retainer may be made by rolling and welding a steel plate.

Also, the retainer may be made by cutting and grinding a steel ingot, or by injection molding of a resin.

Advantageous Effects of Invention

As described above, according to the present invention, a retainer's center flange portion has an outer diameter ($\varphi$D2) while end flange portions have an outer diameter ($\varphi$D1), in a relationship expressed as $\varphi$D2<$\varphi$D1. This stabilizes the retainer's behavior during rotation, and reduces premature wear and abnormal noise.

DESCRIPTION OF EMBODIMENTS

Hereinafter, embodiments of the present invention will be described based on the attached drawings.

Figure 1:
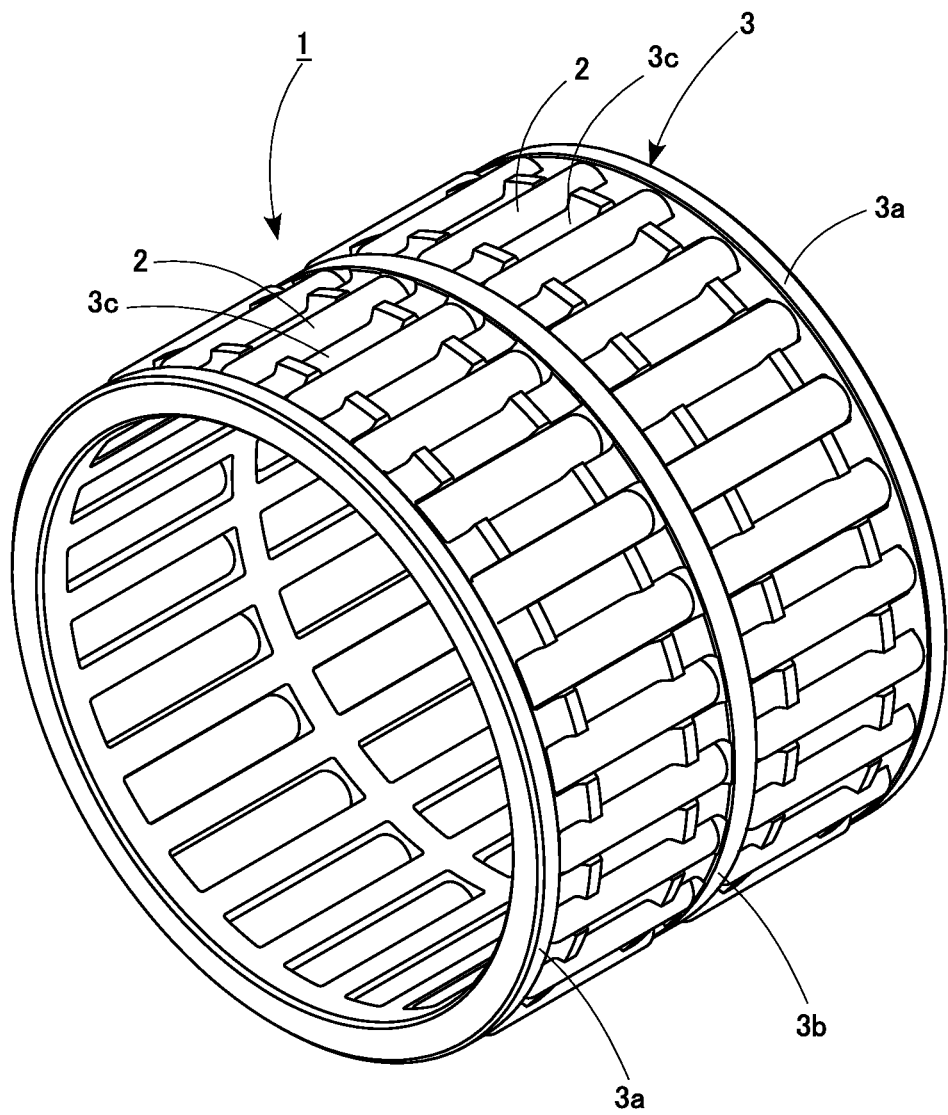
FIG. 1 is a perspective view of a double-row needle-roller bearing with retainer according to the present invention.

As shown in FIG. 1, a retainer-equipped double-row needle-roller bearing 1 according to an embodiment of the present invention includes two rows of rollers 2 held by a retainer 3. The retainer 3 has a pair of annular end flange portions 3a, 3a; a center annular flange portion 3b in the middle; and two rows of pillars 3c, 3c connecting these portions to each other. Each pair of the pillars 3c which are mutually adjacent in a circumferential direction provide a pocket for holding one of the rollers 2. The retainer 3 is guided on its outer diameter or outer/inner diameters.

In the present invention, in the retainer 3 of a double-row type, the center flange portion 3b which has an outer diameter (φD2) and the end flange portions 3a which have an outer diameter (φD1) have a relationship expressed as φD2<φD1. In other words, the outer diameter (φD2) of the center flange portion 3b is smaller than the outer diameter (φD1) of the end flange portions 3a.

Figure 2:
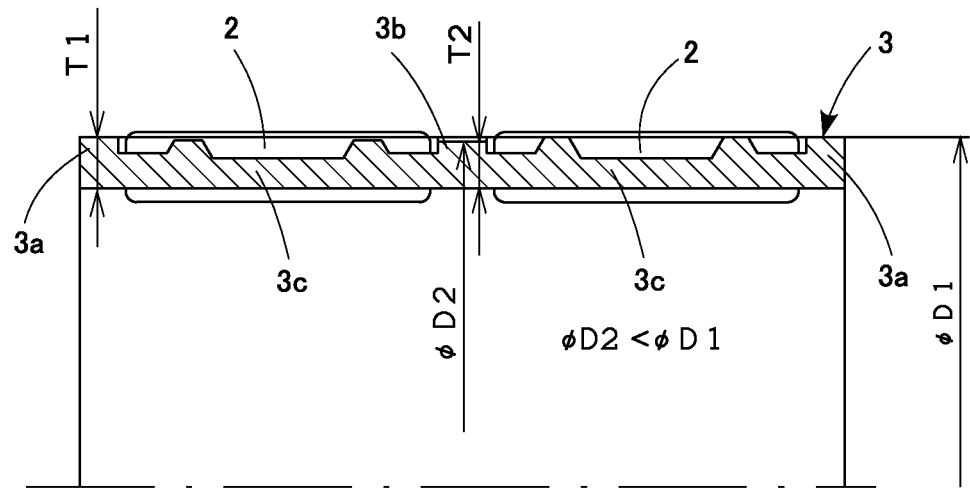
FIG. 2 is a sectional view of the retainer according to the present invention in FIG. 1.

In order to achieve the relationship φD2<φD1, as shown in FIG. 2, the center flange portion 3b is made to have a smaller thickness T2 than a thickness T1 of the two end flange portions 3a by appropriate means. In order to make the thickness smaller, coining may be performed to retainer material to reduce the thickness of the center flange portion, or material in the center flange portion may be partially removed mechanically by grinding or the like.

The outer diameter (φD2) of the center flange portion 3b in the retainer 3 is slightly smaller than the outer diameter (φD1) of the end flange portion 3a. If too small, the retainer 3 will have a reduced rigidity, leading to fracture of the retainer 3. Therefore, it is necessary to select a value which will not allow the outer diameter (φD2) of the center flange portion 3b to become greater than the outer diameter (φD1) of the end flange portion 3a even in the deformed state. Preferably, the value is T2≥0.8×T1, and more preferably, T2≥0.9×T1.

Figure 3:
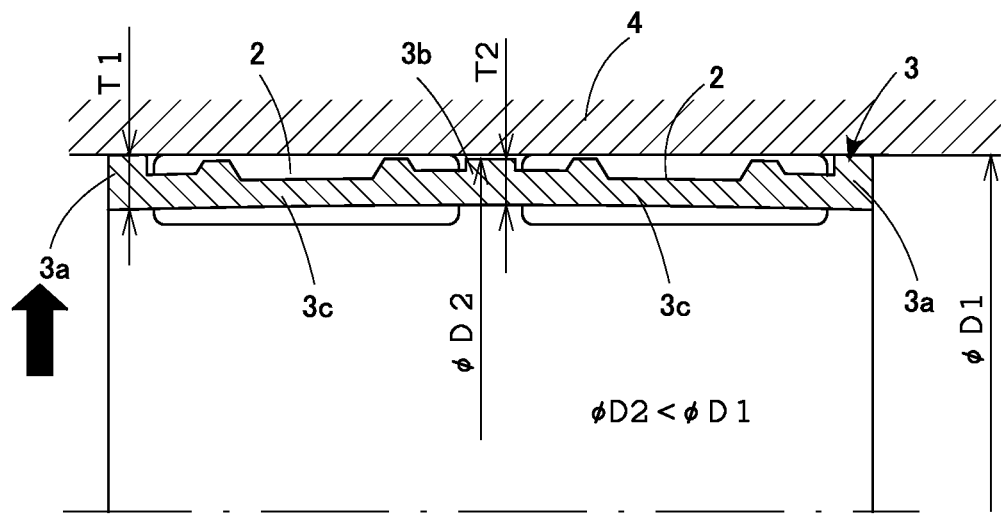
FIG. 3 is a sectional view showing a state that a retainer according to the present invention which was deformed due to heat treatment is moved radially.
Figure 4:
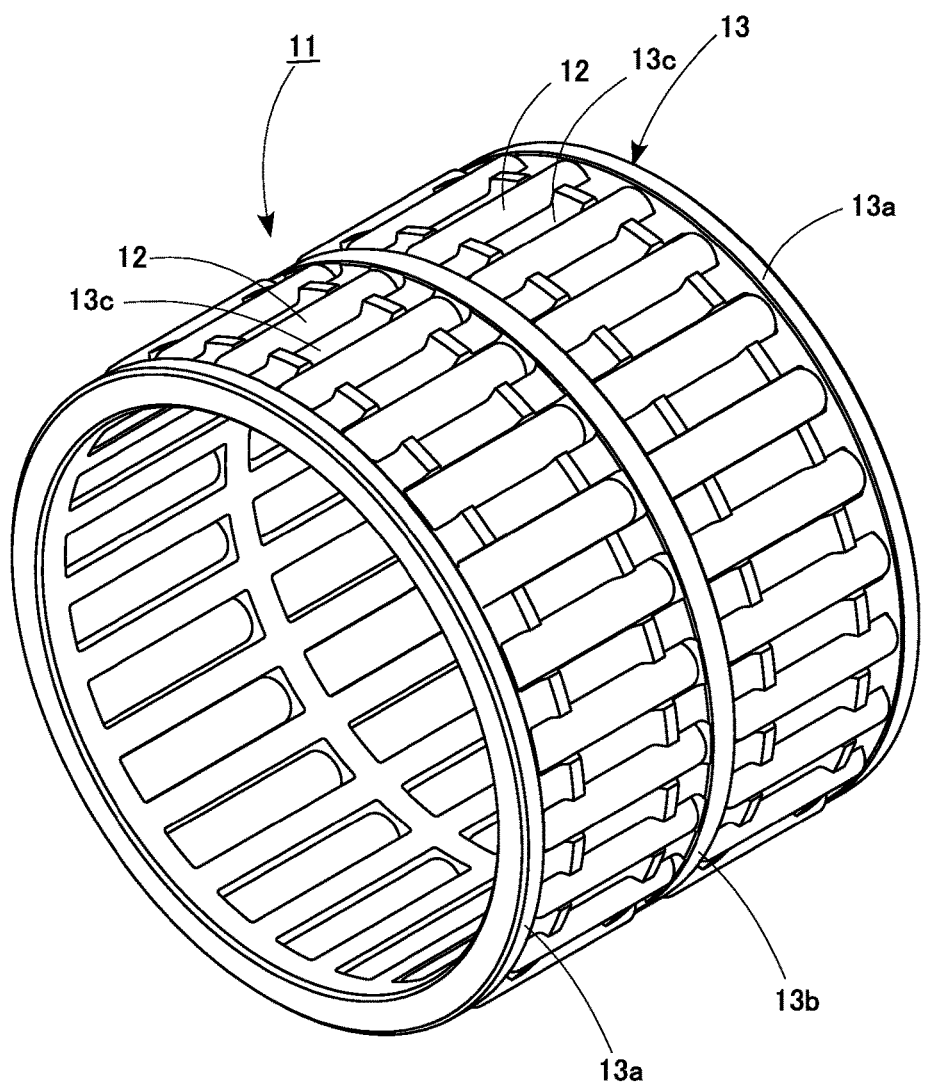
FIG. 4 is a perspective view of a conventional double-row needle-roller bearing with retainer.
Figure 5:
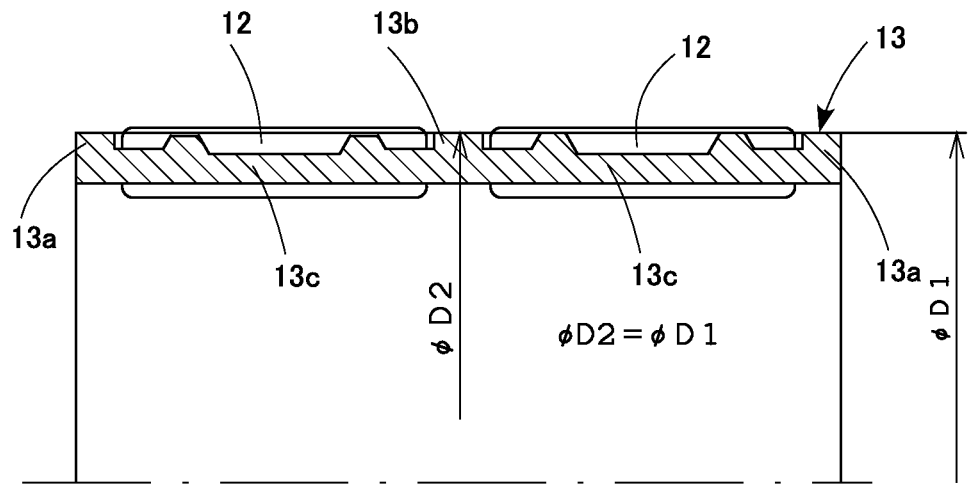
FIG. 5 is a sectional view of a retainer of the conventional double-row needle-roller bearing with retainer in FIG. 4.
Figure 6:
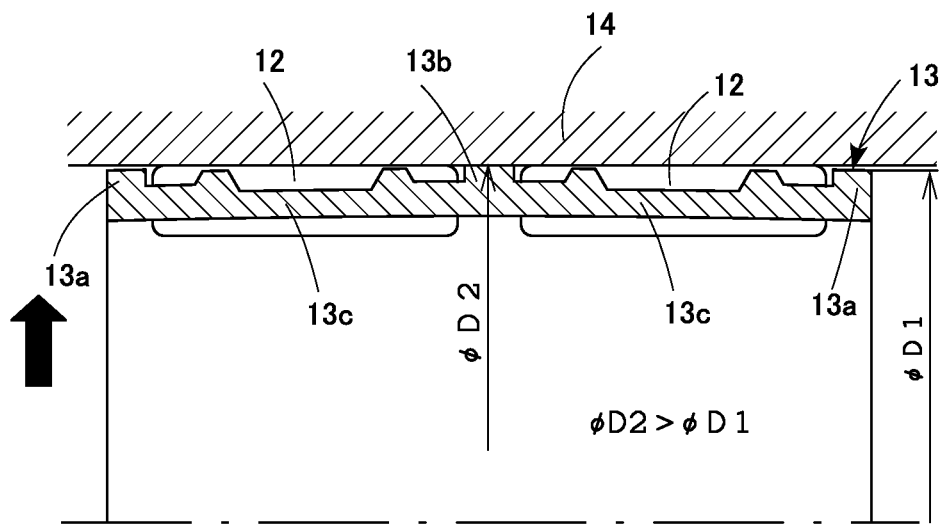
FIG. 6 is a sectional view showing a state that the conventional retainer which was deformed due to heat treatment is moved radially.

The retainer 3 according to the present invention has the outer diameter (φD2) of the center flange portion 3b and the outer diameter (φD1) of the end flange portions 3a in the retainer 3 being in the relationship expressed as φD2<φD1. This stabilizes rotation behavior of the retainer 3, as indicated by an arrow in FIG. 3, since the outer diameter surface of the end flange portions 3a at two ends of the retainer 3 are guided by the inner diameter surface of the housing 4 when the retainer 3 moves radially by an amount of gap associated with the rollers 2, reducing premature wear and abnormal noise.

The retainer 3 may be heat treated and then be utilized after the heat treatment without performing grinding on its outer diameter.

The retainer 3 may be formed by grinding or pressing.

Also, the retainer 3 may be made by rolling and welding a steel plate.

Also, the retainer 3 may be made by cutting and grinding a steel ingot, or by injection molding of a resin.

REFERENCE SIGNS LIST

1 Bearing
3 Retainer
3a End flange portion
3b Center flange portion
3c Pillar
4 Housing
T1 Thickness
T2 Thickness

The invention claimed is:

1. A retainer-equipped double-row needle-roller bearing comprising:
    a retainer designed to be guided on an outer diameter of the retainer, the retainer including:
    a pair of annular end flange portions;
    an annular center flange portion; and
    two rows of pillars connecting said pair of end flange portions and said center flange portion to each other, and the end flange portions, the center flange portion, and the pillars form a single member in a thickness direction and in an axial direction and are heat treated; and
    a plurality of rollers held in the pockets of the retainer,
    wherein the center flange portion is made to have a thickness T2 smaller than a thickness T1 of each end flange portion of the pair of end flange portions at two ends and the center flange portion and the pair of end flange portions are made to have a greater thickness than a thickness of the pillars in a radial direction, thereby the radial thickness of the retainer is made unequal in its axial direction, and the center flange portion has an outer diameter (φD2), each end flange portion of the pair of end flange portions has an outer diameter (φD1), and the outer diameter (φD2) of the center flange portion and the outer diameter (φD1) of each end flange portion are made to have a relationship of φD2<φD1.

2. The retainer-equipped double-row needle-roller bearing according to claim 1, wherein the thickness T2 of the center flange portion and the thickness T1 of each end flange portion of the pair of end flange portions at the two ends have a relationship of T2≥0.80×T1.

* * * * *